United States Patent
Schläfer et al.

(10) Patent No.: US 6,890,508 B2
(45) Date of Patent: May 10, 2005

(54) PREPARATION OF LARGELY HBR-FREE HCl GAS AND LARGELY HBR-FREE AQUEOUS HCl SOLUTION

(75) Inventors: Dieter Schläfer, Ludwigshafen (DE); Josef Guth, Freinsheim (DE); Hans-Ulrich Schlimper, Dudenhofen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 132 days.

(21) Appl. No.: 10/309,128

(22) Filed: Dec. 4, 2002

(65) Prior Publication Data

US 2003/0108468 A1 Jun. 12, 2003

(30) Foreign Application Priority Data

Dec. 10, 2001 (DE) .......................................... 101 60 598

(51) Int. Cl.$^7$ ................................................ C01B 7/07
(52) U.S. Cl. .................... 423/488; 423/240 R; 423/481; 95/211; 95/233
(58) Field of Search ............................ 423/240 R, 481, 423/488; 95/211, 233

(56) References Cited

U.S. PATENT DOCUMENTS

| | | | | |
|---|---|---|---|---|
| 4,119,413 A | * | 10/1978 | Larsen et al. ................. | 95/182 |
| 4,254,092 A | * | 3/1981 | Coenen et al. ............... | 423/497 |
| 4,299,606 A | * | 11/1981 | Robota et al. ................ | 62/620 |
| 4,349,525 A | * | 9/1982 | Yamashita et al. .......... | 423/488 |
| 4,830,846 A | * | 5/1989 | Jackson et al. ............. | 423/488 |
| 5,846,387 A | | 12/1998 | Hoffman et al. ............ | 423/483 |
| 2002/0159945 A1 | * | 10/2002 | Burghardt et al. .......... | 423/488 |
| 2003/0019360 A1 | * | 1/2003 | Krissman et al. ............ | 95/233 |

FOREIGN PATENT DOCUMENTS

| | | |
|---|---|---|
| DE | 1 567 494 | 9/1970 |
| WO | 01/25144 | 4/2001 |

OTHER PUBLICATIONS

Derwent Abst. 2001–344865/37.

* cited by examiner

*Primary Examiner*—Ngoc-Yen Nguyen
(74) *Attorney, Agent, or Firm*—Novak Druce & Quigg, LLP

(57) ABSTRACT

The present invention relates to a process for preparing largely HBr-free HCl gas and largely HBr-free aqueous HCl solution, which comprises the following steps:
a) providing HBr-containing HCl gas;
b) passing the HBr-containing HCl gas through aqueous HCl solution saturated with HCl;
c) separating off HBr-containing aqueous HCl solution saturated with HCl;
d) if desired, passing the largely HBr-free HCl gas obtained in step b) into water to obtain largely HBr-free aqueous HCl solution;
with largely HBr-free aqueous HCl solution produced in step d) being able, if desired, to be recirculated to step b) of the process.

The process of the present invention allows high-purity aqueous HCl solution for use in the semiconductor industry to be prepared inexpensively and on an industrial scale. However, the purified HCl gas obtained by means of steps a) to c) can also be used for any other purposes. The invention likewise provides an apparatus for carrying out the process of the present invention.

12 Claims, 1 Drawing Sheet

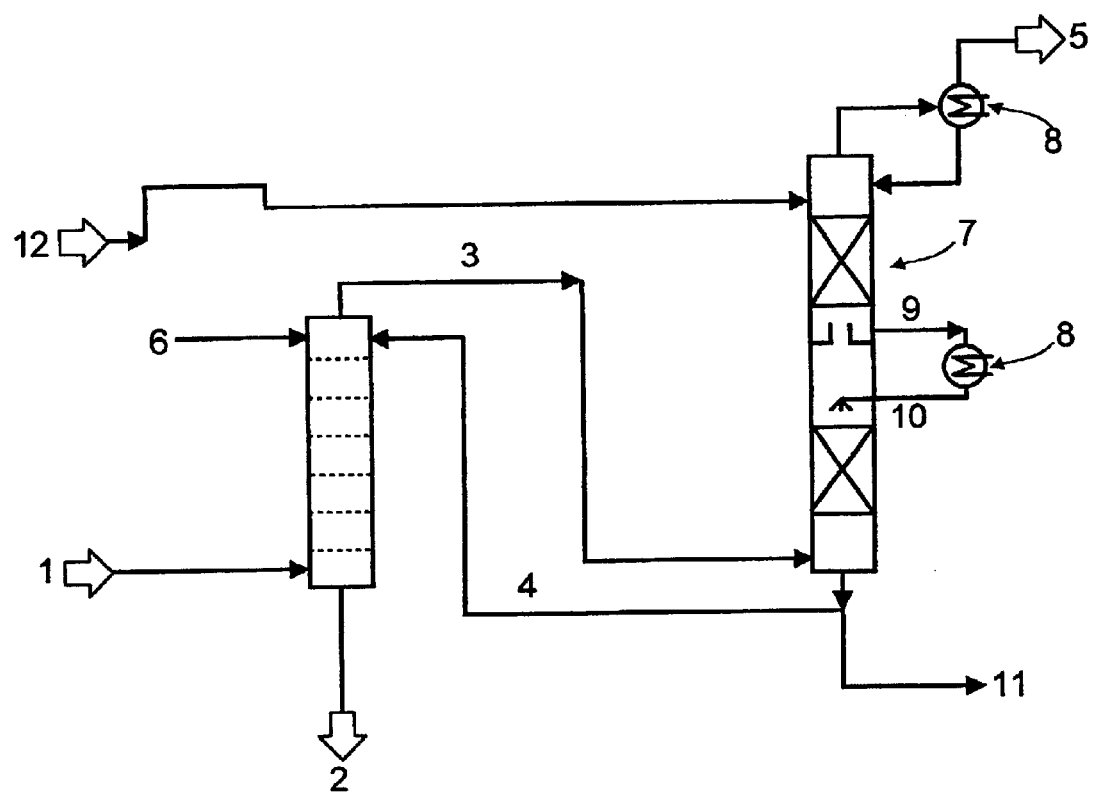

PREPARATION OF LARGELY HBR-FREE HCl GAS AND LARGELY HBR-FREE AQUEOUS HCl SOLUTION

The present invention relates to a process for preparing largely HBr-free HCl gas and largely HBr-free aqueous HCl solution and to an apparatus for carrying out this process.

Aqueous HCl solution (aqueous hydrochloric acid) which is to be used in the semiconductor industry must have only an extremely low content of HBr and of other impurities such as chlorine and metal chlorides. This is because in the production of electronic components, the incorporation of undesired extraneous atoms into the components causes particular problems.

In the process of WO 01/25144, this objective is achieved by driving the HCl gas from an aqueous hydrochloric acid having an HCl content of more than 21% by weight by heating, passing the resulting HCl gas through a retention column and an aerosol precipitator, both made of fluorinated or perfluorinated polyolefin, and subsequently dissolving this HCl gas in high-purity water in an absorption column. The hydrochloric acid obtained in this way has an HBr content of <1 ppm. However, this process is very energy-intensive because of the distillation step. In addition, a large amount of dilute hydrochloric acid is obtained.

U.S. Pat. No. 5,846,387 describes a likewise energy-intensive process in which HCl gas is taken from a reservoir containing anhydrous HCl gas or is driven from aqueous hydrochloric acid and flows through a packed column in countercurrent to water having a low pH, preferably aqueous hydrochloric acid. Impurities such as oxides, carbonates, hydrides and halides of transition metals and metals of main groups I, II and III and also phosphorus/arsenic/antimony halides and hydrides can be removed by means of this scrubbing procedure. Part of the HCl gas which has been purified in this way is subsequently passed into pure, preferably deionized, water to obtain hydrochloric acid suitable for use in the semiconductor industry. Distillation steps may be employed between these individual steps. The removal of HBr is not mentioned.

It is an object of the present invention to provide a simple and inexpensive process for preparing largely HBr-free HCl gas and largely HBr-free aqueous HCl solution, which process avoids the disadvantages of the prior art.

We have found that this object is achieved by a process for preparing largely HBr-free HCl gas or largely HBr-free aqueous HCl solution, which comprises the following steps:
a) providing HBr-containing HCl gas;
b) passing the HBr-containing HCl gas through aqueous HCl solution saturated with HCl;
c) separating off HBr-containing aqueous HCl solution saturated with HCl;
d) if desired, passing the largely HBr-free HCl gas obtained in step b) into water to obtain largely HBr-free aqueous HCl solution;
with largely HBr-free aqueous HCl solution produced in step d) being able, if desired, to be recirculated to step b) of the process.

The process of the present invention makes it possible to prepare aqueous HCl solution which meets the high purity requirements for use in the semiconductor industry. The HBr content of the HCl gas or the aqueous HCl solution obtained by means of the process of the present invention is generally below 10 ppm, preferably below 2 ppm, particularly preferably below 1 ppm. The purification step b) likewise removes cations and chlorine, so that the cation content of the largely HBr-free HCl solution obtained according to the present invention is below 10 ppm, preferably below 1 ppm, and the $Cl_2$ content of the largely HBr-free HCl solution obtained according to the present invention is below 5 ppm, preferably below 0.5 ppm. The individual steps of the process of the present invention will now be described in detail.

Step a)

The HBr-containing HCl gas can be prepared by any process known from the prior art. Thus, it is possible to obtain HCl gas by synthesis from the elements hydrogen and chlorine, by reaction of metal chlorides (in particular sodium chloride) with sulfuric acid or hydrogensulfate, as by-product in the chlorination of hydrocarbons, by thermal decomposition of hydrated heavy metal chlorides or by incineration of $Cl_2$-containing organic waste, as long as traces of bromine are present in the starting materials.

Preference is given to using HCl gas which has been prepared from the elements hydrogen and chlorine, with the chlorine originating, in particular, from chloralkali electrolysis by the amalgam, diaphragm or membrane process. Particular preference is given to using HCl gas which has been prepared by reaction of chlorine with a 20 mol % excess of hydrogen.

Depending on the starting material, the HBr content of the HCl gas can be from 30 to 2000 ppm.

Step b)

The saturation of an aqueous solution of HCl is temperature dependent. For example, a saturation of 40%, i.e. the aqueous solution has an HCl content of 40% by weight, can be achieved at room temperature. For the purposes of the present invention, aqueous HCl solution saturated with HCl (saturated aqueous hydrochloric acid) is an aqueous solution which contains from 35 to 40% by weight of HCl at from 20 to 30° C.

The aqueous HCl solution saturated with HCl used in step b) can in principle already contain some HBr, but the saturation limit for HBr must not yet have been reached. Preference is given to using an HCl-saturated aqueous HCl solution whose HBr content is below 10 ppm. Particular preference is given to using the aqueous HCl solution saturated with HCl which is obtained in step d) of the process.

While the HBr-containing HCl gas is generally at ambient temperature, i.e. at from 10 to 30° C., the aqueous HCl solution saturated with HCl which is fed in is generally at from 30 to 35° C., which means that the purification generally proceeds at from 30 to 40° C.

The HBr-containing HCl gas is generally passed at a slight gauge pressure of from 80 to 100 mbar into the reaction vessel used in step b).

The HBr-containing HCl gas can be passed through the aqueous HCl solution saturated with HCl either in cocurrent or in countercurrent. However, the HBr-containing HCl gas is preferably passed through the aqueous HCl solution saturated with HCl in countercurrent.

Step b) of the process can be carried out, in particular, in any tray column. Particular preference is given to using sieve tray columns, very particularly preferably ones whose sieve trays consist essentially of polymers such as polyvinylidene fluoride, polyvinyl chloride, polyvinyl acetate, polytetrafluoroethylene, perfluoroalkoxy polymers, their copolymers or their mixtures. Among the polymers mentioned, preference is given to polyvinylidene fluoride and perfluoroalkoxy polymers.

If use is made of columns containing low-pressure-drop ordered or random packing (Raschig rings, Pall rings, Melapak® from Sulzer in Winterthur/Switzerland) which consists essentially of the abovementioned polymers, the surfaces of this ordered or random packing may not be wetted completely. However, this would significantly reduce the effectiveness and has to be compensated for by increasing the amount of HCl-saturated aqueous HCl solution which is fed in.

On the other hand, the use of sieve tray columns with trays based on polymers ensures that efficient scrubbing occurs even at low liquid throughput. For this reason, sieve tray columns do not have to be built as high as the corresponding columns containing random or ordered packing in order to achieve the same effect. Sieve tray columns are therefore more advantageous in terms of capital cost.

To minimize the consumption of aqueous HCl solution saturated with HCl, the column is generally operated at a liquid throughput of less than 2 $m^3$ of HCl-saturated aqueous HCl solution per $m^2$ of contact area and per hour, preferably at a liquid throughput of less than 1.5 $m^3/m^2 \cdot h$, particularly preferably at a liquid throughput of $\leq 1$ $m^3/m^2 \cdot h$.

When sieve tray columns are used, the HBr-containing HCl gas is generally introduced in the lower third of the column, while the aqueous HCl solution saturated with HCl is introduced in the upper third of the column. The HBr-containing HCl gas is preferably fed in below the lowermost sieve tray and above the bottom outlet and/or the aqueous HCl solution saturated with HCl is introduced above the uppermost sieve tray.

In a very particularly preferred variant, sieve tray columns having at least 8 trays are used.

When such a column is started up for the first time for carrying out step b), the aqueous HCl solution saturated with HCl is firstly generated in situ by feeding water instead of aqueous HCl solution saturated with HCl into the column. The HCl gas then dissolves in the water until an aqueous HCl solution saturated with HCl is obtained. From the time at which an aqueous HCl solution saturated with HCl is present in the column, the HCl gas will flow through the solution essentially without absorption. When water is used in place of aqueous HCl solution saturated with HCl, additional cooling elements are used in the column.

A droplet precipitator is installed downstream of the reaction vessel, in particular a sieve tray column, used in step b). This can be configured as a separate component or can be integrated into the top of the sieve tray column. In a preferred variant, it is integrated into the top of the sieve tray column. The droplet precipitator is usually made of the same materials as are used for the sieve trays, i.e. basically polymers such as polyvinylidene fluoride, polyvinyl chloride, polyvinyl acetate, polytetrafluoroethylene, perfluoroalkoxy polymers, their copolymers or their mixtures.

Step c)

HBr dissolves very readily in aqueous HCl solution saturated with HCl, while HCl gas flows through the aqueous HCl solution saturated with HCl, essentially without being absorbed further. HBr-containing aqueous HCl solution saturated with HCl collects at the bottom of the column and is removed from there either continuously or from time to time. Preference is given to continuous removal. If the HBr-containing aqueous HCl solution saturated with HCl is removed discontinuously, this must be carried out at the latest when the HCl-saturated aqueous HCl solution is saturated with HBr. The HBr-containing aqueous HCl solution saturated with HCl can still be used for applications in which only a technical-grade solution is required.

The steps b) and c) allow HCl gas whose HBr content is below 10 ppm (mg of HBr per kg of aqueous HCl solution), preferably below 2 ppm, particularly preferably below 1 ppm, to be obtained. The process of the present invention also makes it possible to remove the HBr from the HCl gas to such an extent that the HBr content is below the analytical detection limit of 0.2 ppm (ion chromatography). This HCl gas or this aqueous HCl solution can be used for any applications which require such a purity, in particular for such applications in the semiconductor industry.

Step d)

The largely HBr-free HCl gas is taken off at the top of the column used in step b) and c) and can then be passed into water in a reaction vessel to obtain largely HBr-free aqueous HCl solution. Here, the HBr-containing HCl gas is generally under a slight gauge pressure of from 30 to 70 mbar.

Step d) is preferably carried out using an absorption column, in particular a column containing random or ordered packing, whose internal structure particularly preferably consists essentially of polymers such as polyvinylidene fluoride, polyvinyl chloride, polyvinyl acetate, polytetrafluoroethylene, perfluoroalkoxy polymers, their copolymers or their mixtures. In a very particularly preferred variant, a column packed with Pall rings made of polyvinylidene fluoride is used. However, other low-pressure-drop shapes known to those skilled in the art can also be used as packing. In this way, a very large surface area for good distribution of the liquid together with a low pressure drop can be achieved.

In step d), too, the HCl gas is preferably introduced in countercurrent to the water. The HCl gas is particularly preferably introduced in the lower third of the absorption column, while the water is introduced in the upper third of the absorption column.

If aqueous HCl solution for use in the semiconductor industry is prepared by the process of the present invention, the largely HBr-free HCl gas is passed into high-purity water in step d). For the purposes of the present invention, high-purity water is water which has been specially purified, in particular substantially deionized, in an ion exchange unit.

Largely HBr-free aqueous HCl solution of any concentration can be prepared by means of the process of the present invention.

The boiling point of aqueous HCl solution is dependent on the HCl content of the solution; the boiling point decreases with increasing HCl content. If largely HBr-free aqueous HCl solution having a concentration of $\geq 30\%$ by weight is to be prepared, it has therefore been found to be advantageous, due to the exothermic solution process, to take off liquid in the middle region or the lower half of the absorption column, to cool the liquid which has been taken off and to return the cooled liquid to the absorption column at a point lower down the column. In the case of the polymer materials used for producing the absorption column, the customary integrated installation of a cooler in the absorption column is not possible. Cooling is carried out by means of an external, inexpensive cooler. To take liquid from the absorption column, preference is given to installing two distributor trays in the middle region or the lower half of the absorption column. The hot liquid is then taken off via the uppermost of the two distributor trays, while the cooled liquid is returned to the absorption column at the lowermost of the two distributor trays. This procedure enables costly cooling elements in the upper region of the absorption column to be dispensed with, as a result of which the capital costs for a plant for carrying out the process of the present invention are decreased.

The desired product, viz. the largely HBr-free aqueous HCl solution, is taken from the bottom of the absorption column after the desired concentration has been reached.

The off-gases are taken off at the top of the absorption column and are discharged, advantageously after cooling and passage through a downstream second absorption column.

If aqueous HCl solution saturated with HCl is prepared in step d) of the process, part of this solution can advantageously be used in step b) of the process. Here, the aqueous HCl solution saturated with HCl is cooled, preferably to below 30° C.

The temperatures in the absorption column are usually in the range from 30 to 110° C., preferably from 60 to 108° C.

The present invention likewise provides an apparatus for carrying out the process of the present invention, which comprises the following components:

i) a tray column for scrubbing the HBr-containing HCl gas with HCl-saturated aqueous HCl solution:
ii) a droplet precipitator;
iii) a purification facility for producing high-purity water;
iv) an absorption column for dissolving the largely HBr-free HCl gas purified in the tray column i) in the high-purity water obtained in the purification facility iii) to give largely HBr-free aqueous HCl solution, plus lines between the individual components.

The components i), ii) and iv) have been described above, the tray column and the droplet precipitator in step b) and the absorption column in step d).

The purification facility for obtaining the high-purity water is an ion exchange unit.

The lines between the individual components are generally made of the same materials as the sieve tray column and the absorption column, i.e. of acid-resistant polymers such as polyvinylidene fluorine, polyvinyl chloride, polyvinyl acetate, polytetrafluoroethylene, perfluoroalkoxy polymers, their copolymers or their mixtures.

In the accompanying drawing,

FIG. 1 schematically shows a plant in which the process of the present invention for preparing largely HBr-free aqueous HCl solution is preferably carried out.

In a first column 6 (sieve tray column having 8 trays), HBr-containing HCl gas at 10–30° C. (ambient temperature) and under a slight gauge pressure of 50–100 mbar is introduced at the bottom via line 1 and HCl-saturated aqueous HCl solution at 30–35° C. is introduced into the column at the top via line 4 and trickles down in countercurrent to the ascending gas.

Since HBr dissolves particularly readily in aqueous HCl solution saturated with HCl, this HCl-saturated aqueous HCl solution contaminated with HBr collects at the bottom of the column where it can be discharged continuously via a line 2. The HCl-saturated aqueous HCl solution which has thus been contaminated with HBr is still suitable for applications in which technical-grade hydrochloric acid can be used.

The largely HBr-free HCl gas which results from scrubbing with aqueous HCl solution saturated with HCl and is at a temperature which is usually 5° C. higher than ambient temperature and a gauge pressure of 30–70 mbar is taken off at the top of the column 6 via a line 3 and is fed from the bottom into a second column 7 (absorption column).

High-purity water at 20–30° C. is introduced into the column at the top via a line 12 and flows in countercurrent to the HCl gas. The temperature in the column 7 is generally in the range from 30 to 110° C.

If aqueous HCl solution having an HCl content of ≧30% by weight is to be prepared, liquid is taken continuously from the column 7 via a side offtake 9, cooled in a heat exchanger 8 and fed back into the column 7 via a side inlet which is preferably located somewhat below the offtake point.

The desired product, viz. the largely HBr-free aqueous HCl solution, is taken from the bottom of the column 7 via a line 11 and is cooled if necessary. Part of the aqueous HCl solution which has been taken off and cooled if necessary is, if it is saturated with HCl, branched off via line 4 for scrubbing the HBr-containing HCl gas.

The off-gases are taken off at the top of the column, condensed in a heat exchanger 8, partly recirculated to the absorption column and partly passed via a line 5 to a further absorption column from which they are, after renewed scrubbing with water, discharged into the environment.

The following example illustrates the invention.

EXAMPLE 350 kg/h of HBr-containing HCl gas, which has been obtained by reaction of chlorine with a 20 mol % excess of hydrogen, is introduced into a sieve tray column having a diameter of 400 mm, a height of 6000 mm and provided with 8 trays made of polyvinylidene fluoride at a point below the first tray. The HBr content of this HCl gas is about 215 mg of bromine as HBr per kg of HCl gas (215 ppm). Above the fifth tray, 141 kg/h of 36% strength by weight aqueous HCl solution having an HBr content of less than 1 ppm are introduced into the sieve tray column. The contaminated aqueous HCl solution taken off at the bottom of the sieve tray column has an HCl content of 40.6% by weight and a bromine content (HBr) of 473 ppm. The HCl gas discharged at the top of the column has an HBr content of less than 1 ppm and is passed from below into an absorption column having a diameter of 400 mm and a height of 8000 mm. High-purity water is fed into the absorption column at the top in an amount of 600 liters per hour. In the lower third of the absorption column, liquid at 74–78° C. is taken continuously from the absorption column. After the liquid has been cooled to 5–6° C., it is fed back into the absorption column at a point somewhat below the offtake point. At the bottom of the absorption column, the desired product, viz. the aqueous HCl solution having an HCl content of 36% by weight and an HBr content of less than 1 ppm, is taken off.

LIST OF REFERENCE NUMERALS

1 HBr-containing HCl gas
2 HCl-saturated aqueous HCl solution enriched in HBr
3 Largely HBr-free HCl gas
4 Recirculation of aqueous HCl solution saturated with HCl
5 Off-gas
6 Column 1 (tray column)
7 Column 2 (absorption column)
8 Heat exchanger/cooling facility
9 Withdrawal of hot aqueous HCl solution
10 Introduction of cooled aqueous HCl solution
11 Outlet for largely HBr-free aqueous HCl solution
12 High-purity water feed

We claim:

1. A process for preparing largely HBr-free HCl gas or largely HBr-free aqueous HCl solution, which comprises the following steps:

a) providing HBr-containing HCl gas;
b) passing the HBr-containing HCl gas through aqueous HCl solution saturated with HCl;
c) separating off HBr-containing aqueous HCl solution saturated with HCl;
d) optionally, passing the largely HBr-free HCl gas obtained in step b) into water to obtain largely HBr-free aqueous HCl solution;

with largely HBr-free aqueous solution produced in step d) being able, optionally, to be recirculated to step b) of the process.

2. The process as claimed in claim 1, wherein step b) of the process is carried out in a tray column or step d) of the process is carried out in an absorption column.

3. The process as claimed in claim 2, wherein the tray column used in step b) of the process is operated at a liquid throughput of less than 2 $m^3/m^2 \cdot h$.

4. The process as claimed in claim 1, wherein step b) of the process is carried out in a tray column and step d) of the process is carried out in an absorption column.

5. The process as claimed in claim 4, wherein the tray column used in step b) of the process is operated at a liquid throughput of less than 2 $m^3/m^2 \cdot h$.

6. The process as claimed in claim 1, wherein step b) of the process is carried out in a sieve tray column.

7. The process as claimed in claim 1, wherein part of the aqueous HCl solution obtained by means of step d) is taken from an absorption column used in step d), cooled and returned to this absorption column.

8. The process as claimed in claim 1, wherein largely HBr-free aqueous HCl solution having an HBr content below 10 ppm (mg of HBr/kg of aqueous HCl solution) is prepared.

9. The process as claimed in claim 1, wherein largely HBr-free aqueous HCl solution having a concentration of $\geq 30\%$ by weight of HCl is prepared.

10. The process as claimed in claim 1, wherein, in step b) of the process, the HBr-containing HCl gas is passed in countercurrent through the aqueous HCl solution saturated with HCl.

11. The process as claimed in claim 6, wherein the sieve trays consist essentially of a material selected from the group consisting of polyvinylidene fluoride, polyvinyl chloride, polyvinyl acetate, polytetrafluorethylene, perfluoroalkoxy polymers, their copolymers and their mixtures.

12. The process as claimed in claim 11, wherein said sieve tray column is operated at a liquid throughput of less than 2 $m^3/m^2 \cdot h$.

* * * * *